3,383,247
PROCESS FOR PRODUCING A FUEL CELL
ELECTRODE
Otto J. Adlhart, Newark, N.J., Antal J. Hartner, New York, N.Y., and Robert C. Langley, Millington, N.J., assignors to Engelhard Industries, Inc., Newark, N.J., a corporation of Delaware
Filed Aug. 19, 1965, Ser. No. 480,959
2 Claims. (Cl. 136—120)

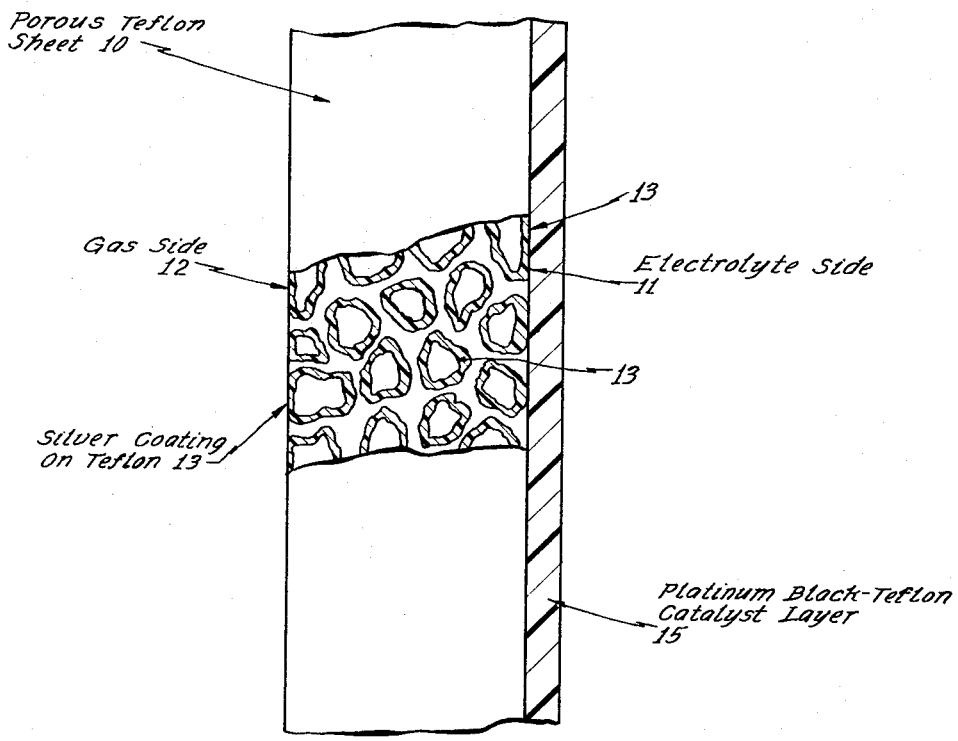

This invention relates to fuel cells, and more particularly to a new and improved fuel cell electrode and to methods of producing such electrode.

The structural characteristics required for high performance fuel cell electrodes are by now generally known to the art. Highly porous and thin electrode configurations are required to provide rapid diffusion rates minimizing mass transport limitations. Good electrode performance is obtained with such structures even with a diluted reactant such as air as the oxidant.

It is the object of this invention to provide a highly porous thin electrically conductive plastic electrode which is operable in fuel cells using alkaline electrolytes. It is another object of this invention to provide a fuel cell electrode with electrical conductivity across its opposite faces as well as along the outer surfaces. It is a further object of this invention to provide a fuel cell electrode consisting of a highly porous perfluorinated polymer substrate which is metallized on the surface and throughout the pores.

In accordance with the present invention, a fuel cell electrode is provided consisting of a highly porous perfluorinated polymer substrate which is completely metallized by depositing on the surface and throughout the pores thereof a thin coherent electrically conductive silver film. Suitable electrode catalysts well known to the art are deposited upon the silver-coated plastic substrate to provide the electrode fo the present invention.

An electrode of this invention can withstand temperatures to about 200° C. and can be used with alkaline electrolytes of high concentration. The silver film throughout the electrode provides conducting characteristics to the non-conducting perfluorinated substrate, enabling transfer of current generated at the electrode across opposite faces of the electrode from the electrolyte side to the gas side as well as along the outer surfaces.

The perfluorinated polymer substrate has fluorine substituted for hydrogen so that it contains on hydrogen. The preferred perfluorinated polymer is polytetrafluoroethylene. It will be understood that alternative to the polytetrafluoroethylene polymer specifically disclosed in this specification other perfluorinated polymers may be used with similar advantageous characteristics as regards high temperature stability, coating with silver by the method of this invention, and resistance to wetting and attack by hot concentrated alkaline electrolytes.

The polyeterafluoroethylene substrate which forms the body of the electrode may be any suitable commercially available polymer, such as Teflon, preferably in the form of a thin sheet ranging from 5–40 mils, preferably 10–25 mils in thickness, and having a porosity of 25–90%, preferably 50–80%. Typically, porous polytetrafluoroethylene sheets having pore sizes in the rnage of 50–150 microns are suitable.

Porous Teflon having desirable characteristics for use in the electrode of the present invention may be obtained by preparing a homogeneous mixture of Teflon powder (60 wt. percent) and methyl acrylate (40 wt. percent), placing the mixture in a mold and pressing at elevated pressure, e.g. 50 tons/square inch, to form a thin sheet, and sintering the sheet so formed at elevated temperature.

During the sinter process, the methyl acrylate decomposes providing the Teflon film of desired porosity. Alternatively, thick plates of such porous Teflon may be prepared which are sliced into substrates of suitable dimensions. Commercially available porous polytetrafluoroethylene, e.g. "Raybestos" (tape) can be employed as the electrode substrate.

The plastic substrate of the electrode of the present invention is selected because of its softening temperature characteristics, its inertness to corrosive materials and, for its ability to resist wetting by the fuel cell electrolyte, thus preventing "drowning" of the electrode. The hydrophobic characteristic of the substrate introduces certain difficulties in the metallization of the electrode with a thin coherent conductive silver film, particularly in respect of introducing such metal film throughout the pores of the plastic substrate. It has been found that such porous substrates can be successfully coated with continuous thin silver films by means of particular metallo organic solutions of silver as disclosed in copending application U.S. Ser. No. 213,865 of Howard M. Fitch, filed Aug. 1, 1962, now U.S. Patent 3,262,790.

In accordance with the teachings of said application, compositions suitable for depositing bright silver films are obtained from organic solution of silver carboxylate-amine coordination compounds obtained by reacting an amine with a silver carboxylate in the proportion of from about 0.05 mol to one mol of the amine per mol of the silver carboxylate. In the preparation of such compositions, silver carboxylates such as the silver salts of aliphatic, alicyclic, heterocyclic, aryl, alkyl and aralkyl carboxylic acids are admixed, preferably in a solvent at temperatures below about 100° C., with an amine which may be primary, secondary or tertiary, of the aliphatic, alicyclic, heterocyclic or aromatic series. The resultant composition is deposited on a substrate, and heated in the range of 100–350° C. for development of a bright metal silver film.

We have found that an amine complex of silver naphthenate prepared in accordance with the foregoing description is particularly useful for depositing a silver film on perfluorinated polymers by virtue of the fact that an organic solution of such a silver carboxylate-amine complex spreads on the surface of the polymeric substrate providing, upon evaporation of the solvent and heating at elevated temperature, a continuous thin electrically conductive silver film.

While it is essential that silver naphthenate be employed as the silver carboxylate for the purposes of the present invention, the amine complexing agent may be of any of those heretofore taught as suitable for preparing compositions of the aforesaid type. Exemplary of such amines are butyl amine, isoamyl amine, 2-ethylhexyl amine, tert-octyl amine, lauryl amine, dibutyl amine, dioctyl amine, dodecyl amine, triamyl amine, trilauryl amine, cyclohexyl amine, pyridine, morpholine, aniline, benzyl amine, etc.

In the application of the silver naphthenate-amine complex to the porous plastic substrate, the organo-metallic solution is applied under a slight vacuum in order to draw the solution into the pores of the plastic, and to insure that all of the pores are thoroughly wetted with the solution.

After thorough impregnation of the support the completely wetted support is heated to between 100 and about 350° C., to decompose the organic components of the solution, and to develop the silver coating. Preferably, the organo-metallic solution has a silver content of between about 2 wt. percent and 16 wt. percent, and is employed in an amount sufficient to provide from .5 mg./cm.$^2$ to 10 mg. silver/cm.$^2$ on the substrate.

Such deposit will provide a specific resistance on the bulk material of less than 2 ohm-cm. Typically, a Teflon sponge of 50% porosity and 10 mil thickness coated with 3 mg. of silver per cm. will have a resistance measured across opposite faces of the electrode on a 1 cm.$^2$ sample of about 10$^{-3}$ ohm per sq. cm. equivalent to a specific resistance of $4 \times 10^{-2}$ ohm-cm.

Subsequent to the deposition of the silver film, the electrode substrate is coated on one or both sides with a suitable fuel cell electrode catalyst. Such catalysts are well known in the art, e.g. platinum group metal catalysts, silver, admixtures or alloys of these metals, etc. The catalyst may be applied in the form of particulate free metal, e.g. platinum black, or may be supported on particulate supports, e.g. activated carbon, or applied in the form of an admixture with particulate plastic powder. Such techniques of applying suitable catalyst to an electrode substrate are well known and need not be further described here.

Reference is here made to the sole figure accompanying the application, wherein the novel fuel cell electrode of the invention is shown in cross-section. The electrode consists of a porous Teflon sheet 10 having an electrolyte side 11 and a gas side 12. The porous Teflon sheet is coated on the surfaces 11 and 12, and throughout the pores with a thin, adherent silver film 13, shown in greatly enlarged cross-section, and deposited in accordance with the method described herein. A platinum black-Teflon catalyst layer 15 is deposited on the electrolyte side of the electrode.

Electrodes which have been made according to this invention are extremely well suited to use as fuel cell electrodes, either for the oxidation or the reduction reaction which occurs in such cells. Generally, the fuel cell electrodes of this invention are employed in cells having an alkaline electrolyte.

Example

A 0.025 inch thick Teflon sponge of about 70% porosity was prepared by pressing commercial LNP Porous Sponge Teflon Mix 5–55 grade (Liquid Nitrogen Processing Corp.) at 4500 lbs./sq. in. and sintering at 370–380° C. for 2 hours. The Teflon sponge was then impregnated four times with a silver naphthenate solution consisting of

| | Parts by weight |
|---|---|
| Silver naphthenate (32% by wt. Ag.) | 3.1 |
| Toluene | 6.9 |
| Tert-octylamine | 0.48 |

The Teflon sponge was dipped in the impregnated solution and placed on a filter through which a vacuum of about 5 in. Hg was applied for 30 seconds to assure penetration of the solution into the pores. The Teflon sponge was heated to 300° C. after each impregnation to decompose the organic components of the solution and develop the silver coating. The electrode substrate so prepared had a silver loading of about 7 mg./sq. cm. projected area and an air permeability of 21 cc./sec./sq. cm. at 100 mm. water pressure.

The silver-coated Teflon substrate was then coated on one side with a platinum black (75 wt. percent)=Teflon (25 wt. percent) mixture which was applied in 5 layers as an aqueous slurry, with short drying steps (about 3 minutes) at about 70–80° C. after each application. The platinum black was a commercial grade having a BET surface area of 2.17 sq. meters/gm. A total of 6 mg. platinum black was applied per sq. cm. projected area. Finally, the electrode is sintered at 200° C. for 30 minutes.

The electrode prepared in the above fashion was placed in a holder and submerged in a bath of 5 N KOH at 80° C. with the platinum layer facing the electrolyte and then tested in a half-cell using a hydrogen reference electrode. Current was withdrawn with a platinum screen pressed against the gas side of the electrode. First the electrode was tested as an anode using hydrogen fed at atmospheric pressure to the back of the electrode as the fuel. After purging with nitrogen, the electrode was tested as a cathode using oxygen and then air as the feed. At various current densities, the following potentials were recorded:

| | Potential vs. $H_2$ Reference Electrode (Volts) | | |
|---|---|---|---|
| | $H_2$ (Anode) | $O_2$ (Cathode) | Air (Cathode) |
| Current Density (ma./cm.$^2$): | | | |
| 0 | 0 | 1.013 | 0.978 |
| 100 | 0.020 | 0.889 | 0.840 |
| 200 | 0.049 | 0.863 | 0.790 |
| 400 | 0.115 | 0.828 | |

What is claimed is:

1. A process for producing a fuel cell electrode which comprises the steps of impregnating a porous perfluorinated substrate with an organic solution of a silver naphthenate-amine complex, heating said substrate to a temperature between 100 and 350° C. to decompose said complex and form a thin coherent electrically conductive silver coating on said substrate, and applying a metal catalyst to the coated substrate.

2. The process of claim 1 wherein the amine is t-octyl amine.

References Cited

UNITED STATES PATENTS

| 3,235,473 | 2/1966 | LeDuc | 136—86 X |
| 3,276,909 | 10/1966 | Moos | 136—86 |
| 2,689,805 | 9/1954 | Croze et al. | 117—138.8 |
| 2,898,228 | 8/1959 | Kelley | 117—138.8 |
| 3,171,757 | 3/1965 | Duddy | 136—120 X |
| 3,234,050 | 2/1966 | Beltzer et al. | 136—120 X |

WINSTON A. DOUGLAS, *Primary Examiner.*

ALLEN B. CURTIS, *Examiner.*

O. F. CRUTCHFIELD, N. P. BULLOCH,
*Assistant Examiners.*